Feb. 24, 1948.  P. A. PETERSON ET AL  2,436,667
ELECTRIC VEHICLE TURN INDICATOR
Filed May 11, 1945  2 Sheets-Sheet 2
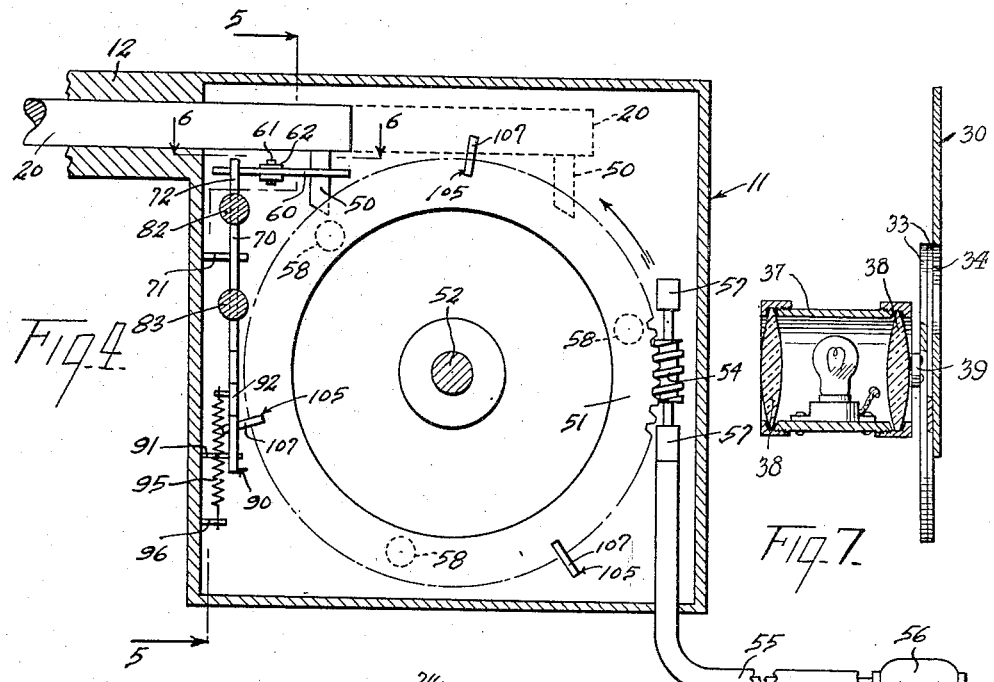
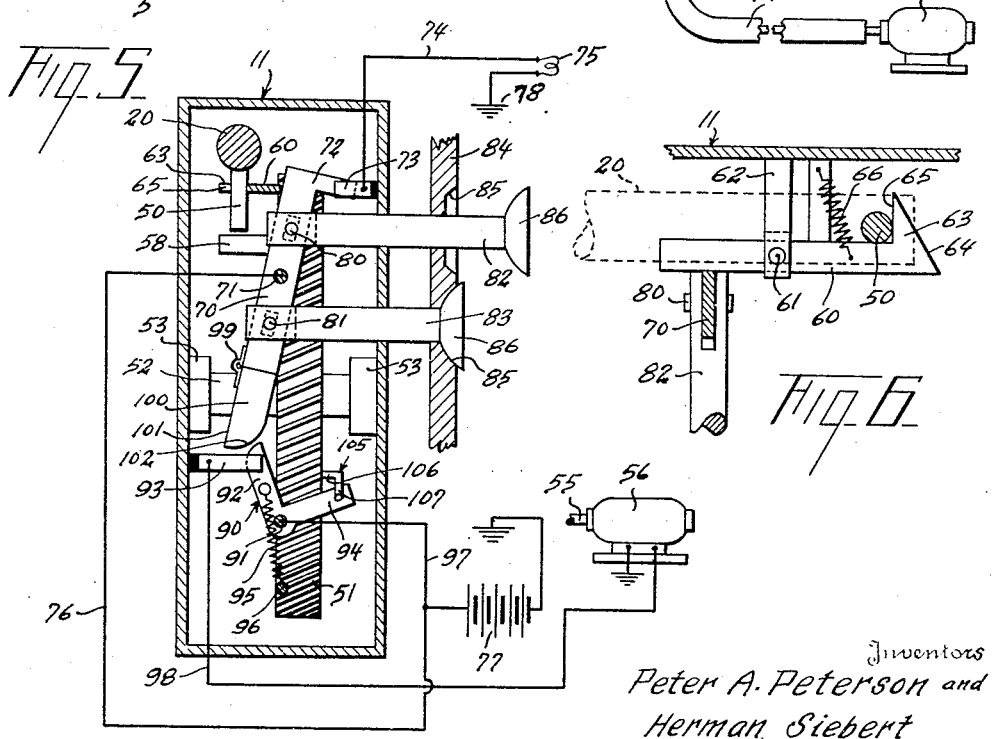
Inventors
Peter A. Peterson and
Herman Siebert
By Carl Miller
Attorney Patented Feb. 24, 1948

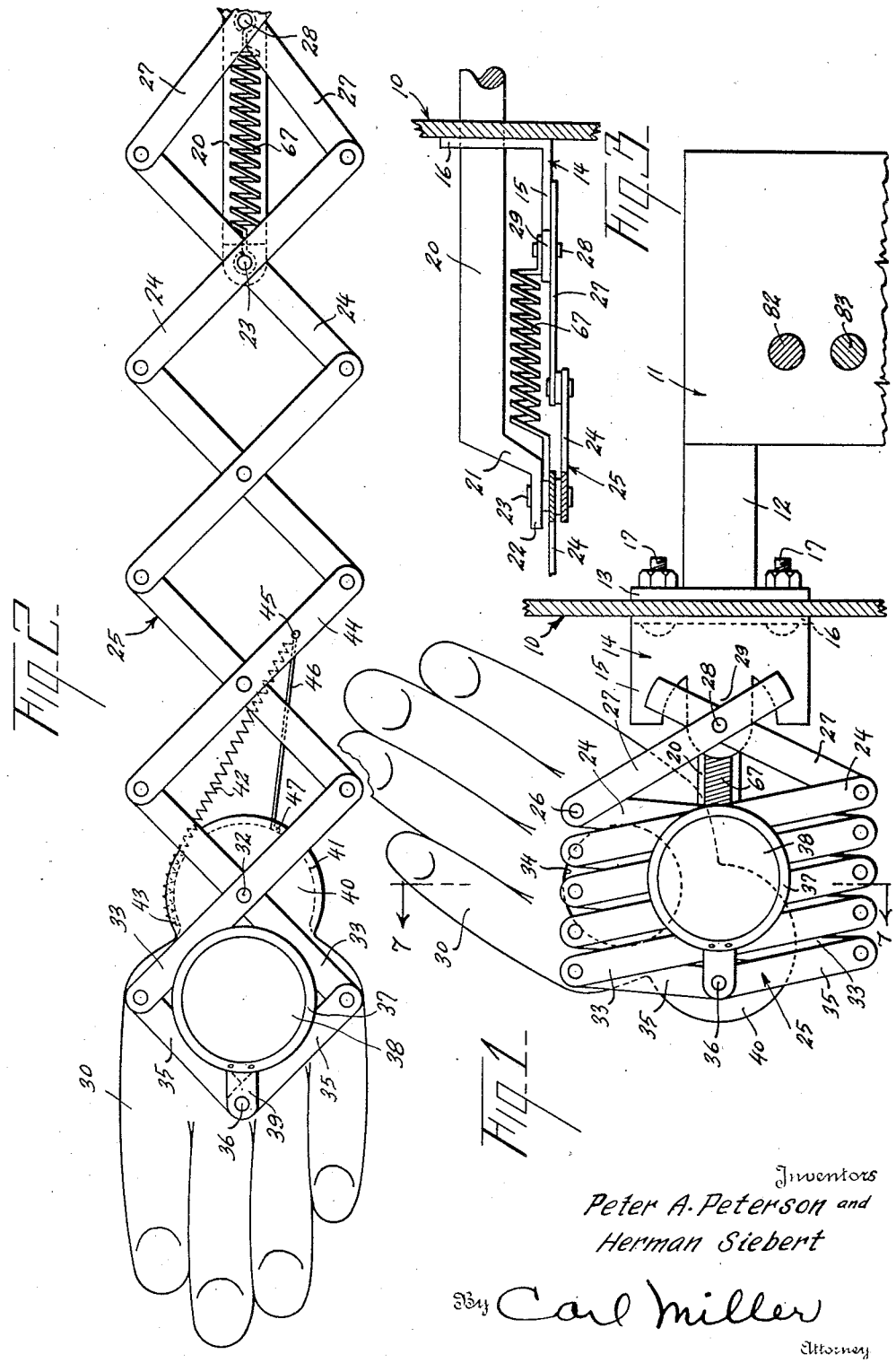

2,436,667

UNITED STATES PATENT OFFICE 2,436,667

ELECTRIC VEHICLE TURN INDICATOR

Peter A. Peterson and Herman Siebert,
South St. Paul, Minn.

Application May 11, 1945, Serial No. 593,270

6 Claims. (Cl. 177—327)

1

This invention relates to signals for vehicles particularly for use on automobiles or other motor vehicles driven on streets and highways.

The object of the invention is to provide a direction indicating signal for use on an automotive vehicle to denote the intention of the driver of the vehicle with regard to turning either to the right or left or of stopping or reducing his speed for the benefit and instruction of the driver of a following or oncoming or approaching vehicle with the general purpose of preventing or minimizing accidents due to collisions, and in that connection to provide a device for this purpose which can be controlled and operated by the driver of the vehicle without necessitating the removal of his left hand from the steering wheel or controlling levers or other instrumentalities which are essential to the driving and control of the vehicle for the purpose of extending the same outwardly to effect a manual signalling by hand.

In carrying out the invention, an indicator member preferably in the form of a hand is provided with extensible means for projecting the indicator out beyond the side of the vehicle into such a position as to be readily seen from both front and back. The projecting or extending means may be attached to any suitable part of the vehicle body preferably the cowl and is operated by a motor driven mechanism controlled by the operator of the vehicle. To be clearly visible at night, the indicator is provided with an electric light so positioned as to cast its light on both sides of the indicator to make it plainly observable from either direction.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein in the drawings—

Fig. 1 is an elevational view of the signalling apparatus in inoperative position mounted on a vehicle body.

Fig. 2 is an elevational view of the extension means of the signalling apparatus shown in operative position.

Fig. 3 is a detail view showing the mounting of the extension means on an extending rod or bar and the spring return arrangement for the extension means.

Fig. 4 is a cross-sectional view through the switch control box showing details of the operating mechanism.

2

Fig. 5 is a cross-sectional view through the switch control box taken on line 5—5, Fig. 4.

Fig. 6 is a detail view taken on line 6—6, Fig. 4, showing locking means for the extending rod.

Fig. 7 is a cross-sectional view through the lamp housing, supporting lenses, and light bulb therein, taken on line 7—7, Fig. 1.

Referring to the drawing 10 denotes a portion of the body wall of an automobile or other vehicle preferably at the cowl portion to which is attached on the inside thereof a switch control box 11 having integral therewith a guide sleeve 12 terminating in a bracket 13. On the outer side of the body wall 10 there is provided a supporting bracket 14, L-shaped in form, having a laterally extending wall 15 and an attaching wall 16. The brackets 14 and 13 are arranged in opposed relation and are attached to the body wall 10 by bolts 17.

Mounted for reciprocating movement in the guide sleeve 12 of the switch control box 11 is an extending rod or bar 20, the inner end of which extends within said box while the outer end thereof projects outwardly through suitable openings in the body wall 10 and attaching wall 16 of the supporting bracket 14, see Fig. 3. The outer end of the bar 20 is provided with a lateral extension 21 terminating in a flat eye 22 in which is mounted a pivot pin 23, which pivotally supports the crossed central portions of the inner links 24 of a lazy-tongs linkage 25. Pivotally connected as at 26 to the outermost ends of the links 24 are the ends of a pair guiding and supporting links 27 which are arranged in crossed relation and pivoted as at 28 to the central portion 29 of the supporting bracket wall 15; the free ends of the links 27 being adapted to have bearing engagement with said supporting bracket wall 15 as clearly shown in Fig. 1. The arrangement of the pivots 23 and 28 of the lazy-tongs 25 is such that they lie in the same horizontal plane.

Carried by the outer end of the lazy-tongs 25 is an indicator 30 which in this instance is represented as a hand formed of metal or any other suitable material. The indicator 30 is placed on the same side of the lazy-tongs 25 as the bar 20 and is pivotally secured at its base to the common pivot 32 of the links 33 of the lazy-tongs 25 as clearly shown in Fig. 2. Formed in the body portion of the indicator hand 30 is a circular opening 34 for a purpose to be hereinafter described. The outer ends of the main links 33 are pivotally connected to end links 35 which are in turn pivotally connected together as at 36.

A circular lamp housing 37 provided with a lens 38 on each side thereof and containing an electric light bulb (not shown) is provided with an arm 39 attached to the end pivot pin 36 in such a manner as to maintain the lamp housing 37 in horizontal position at all times irrespective of the position of the lazy-tongs 25. The diameter of the lenses 38 is made substantially equal to the diameter of the opening 34 in the indicator hand, such that when said indicator hand 30 is brought into operative position in the manner to be hereinafter described, the opening 34 and the lenses 38 of the lamp housing 37 will be in registry, whereby when the light bulb within the lamp housing 37 is lit the same will be visible at the center of the indicator hand 30 from both sides thereof. Preferably the lenses 38 are made of red glass or other red colored transparent material so as to flash red when the light bulb is lit.

The indicator hand 30 is formed at its lower end with a circular base 40, the pivot pin 32 mounting the same at its center to the lazy-tongs 25. Formed in the periphery of the circular base 40 is a groove 41 in which is positioned a small tension coil spring 42, one end of which is fastened to the top end of the groove as at 43, see Fig. 2, while the other end of the spring 42 is fastened to an intermediate portion of a link 44 of the lazy-tongs as at 45. A flexible cable 46 is attached at one end to the spring connection 45 and at its other end to a point in the bottom portion of the groove 41 as at 47. Thus, with the lazy-tongs 25 in collapsed position, see Fig. 1, the indicator hand 30 is upright and slightly inclined towards the vehicle body wall 10. When the lazy-tongs 25 is extended by virtue of outward movement of the bar 20 in the manner as will be hereinafter described, the extension of the links of the lazy-tongs will cause the flexible cable 46 to unwind and straighten out and to thereby rotate the indicator hand 30 about its pivot 32 into its horizontal operative position against the tension of the coil spring 42. Upon collapsing or inward movement of the lazy-tongs, the retraction of the tension coil spring 42 will rotate the indicator hand back to its upright inoperative position in the manner readily apparent.

The control and operating mechanism for the lazy-tongs and light bulb is housed within the control box 11. The inner end of the reciprocating bar 20 as shown in Fig. 4 is horizontally disposed adjacent the top of the control box 11 and is provided with a depending lug 50 rigidly secured to said bar adjacent its end. Positioned laterally of and in spaced relation to the bar 20 is a worm wheel 51 of relatively large diameter supported on a shaft 52 the ends of which are suitably mounted in bearings 53. A worm 54 meshes with the worm wheel 51, said worm being driven by a flexible drive shaft 55 connected to an electric motor 56 and supported in fixed bearings 57 on each side of said worm. The electric motor 56 is located exteriorly of the control box 11 at any suitable position in the vehicle.

Fitted on the face of the worm gear 51 adjacent the bar 20 and in normal relation thereto are a plurality of equally spaced pegs 58 each rigidly secured to said worm gear and so positioned thereon as to engage the lug 50 on the bar 20 when the latter is in its innermost position as indicated by the dotted lines, see Fig. 4. Viewing Fig. 4, the worm gear 51 is driven counter-clockwise, so that, when a peg 58 engages the lug 50 it will impart an outward axial movement to the bar 20 to a point where the peg clears the lug which is in the position of the parts shown in solid lines. This outward movement of the bar 20, by virtue of its connection to the lazy-tongs 25 will extend the same to the position thereof shown in Fig. 2. To reduce friction the pegs 58 may be provided with rollers (not shown) adapted to engage the lug 50.

Lying below the bar 20 and in the path of movement of the bar lug 50 is a horizontal latch 60 pivotally supported intermediate its ends as at 61 on a bracket 62 attached to a wall of the control box 11. The end of the latch 60 opposite the lug 50 is formed with a lateral shoulder 63 the outer edge of which is inclined as at 64, and the inner edge 65 lying normal to the latch 60. Thus, as the lug 50 engages the inclined edge 64 of the latch 60 it will swing the same counter-clockwise about its pivot 61, so that when the lug 50 clears the inclined edge 64, the latch 60 will be forced back under the action of the spring 66 whereby the edge 65 of the shoulder 63 will engage the lug 50 to hold the bar 20 in position. Referring to Fig. 2 it will be noted that a tension coil spring 67 is positioned between the bar 20 and lazy-tongs 25 with its ends respectively connected to the pivots 23 and 28, said spring acting as a return means for the bar 20 and lazy-tongs. The latch 60, therefore, further acts to prevent inward movement of the bar 20 under the action of the return spring 67. When the latch 60 is released in the manner to be hereinafter described, the spring 67 will act to pull the bar 20 back and to collapse the lazy-tongs 25.

Disposed in a vertical plane normal to the horizontal plane of the latch 60 is a switch bar 70 pivotally mounted intermediate its ends for oscillating movement on a pivot pin 71 fixedly attached to a wall of the control box 11. The upper end of the switch bar 70 is provided with a single contact bar 72 adapted to engage a double contact bar 73 attached to the wall of the control box, the contact bars 72 and 73 forming in effect a knife switch of the character well known. A conductor 74 connects the contact bar 73 with one terminal of the electric light bulb 75 in the lamp housing 37, and a conductor 76 connects the switch bar 70 (contact bar 72) to a battery 77. The other terminal of the bulb 75 is grounded as at 78 in the manner well known.

Pivotally connected by a pin and slot connection 80 and 81 respectively to the arms of the switch bar 70 are the plungers 82 and 83 that project outwardly of the control box 11. Preferably the control box 11 is so positioned with reference to the dash 84 that the plungers 82 and 83 also project therethrough. The dash 84 is recessed as at 85 to receive the knobs 86 provided on the ends of the plungers, which knobs are so formed that they each will lie substantially flush with the dash when seated in their respective recess. The plungers 82, 83 are of the same length so that when the plunger 83 is pushed in, the plunger 82 will be moved out. The upper arm of the switch bar 70 crosses the outer arm of the latch 60 and is adapted to engage the same to swing the latch 60 clockwise so as to effect a release of the latch with the lug 50 when the upper plunger 83 is moved inwardly, see Fig. 6. This movement will open the light switch 72, 73 and cause the signalling device to assume the inoperative position shown in Fig. 1, in the manner as described hereinabove.

Arranged below the switch bar 70 and in the same plane therewith is a motor switch comprising a bell crank 90 pivotally mounted on a pivot pin 91 fixed to a wall of the control box 11. One arm 92 of the bell crank forms a contact bar adapted to engage the double contact bars 93 attached to the control box wall to form therewith a knife-switch. The other arm 94 of the bell crank extends across the periphery of the worm wheel 51 and is closely adjacent thereto. A tension coil spring 95 is connected at one end to the contact bar 92 and at its other end to a fixed pin 96 in dead center relation thereto, said spring acting to hold the contact bar 90 in engagement with the contact bar 93 to close the switch or out of engagement therewith to open the switch depending upon which way the bell crank 90 is moved. A conductor 97 connects the battery 77 to contact bar 92, and a conductor 98 connects the contact bar 93 to one terminal of the electric motor 56, the other terminal being grounded. Thus, with the motor switch closed the motor will operate to drive the worm 51, rotation of which will cause the bar 20 to move outwardly to place the signalling apparatus in operative position as hereinabove described.

On the lower end of the switch bar 70 there is hingedly attached as at 99 an abutment 100 having a straight outer edge 101 and a curved inner edge 102. With the motor switch closed and upon pushing the upper plunger 82 in, the abutment 100 on the switch bar 70 will freely ride over the end of the contact bar 92 which is preferably rounded. With the motor switch open, movement of the lower plunger 83 in, will start the signalling apparatus to function, as the edge 101 of the abutment will engage the contact bar 92 to move the same to close the switch which will start the motor 56 running.

Provided on the face of the worm gear 51 opposite to that carrying the pegs 58 are a plurality of trip pegs 105, each of right angle formation to provide a leg 106 normal to said worm gear face and rigidly attached thereto and a leg 107 disposed parallel to said worm gear face and extending radially outwardly with relation thereto. In the preferred construction shown there are three pegs 58 disposed 120° apart on one face of the worm gear 51 and three trip pegs 105 also disposed 120° apart on the other face of the worm gear 51 but offset with relation to the pegs 58 so that each trip peg is attached to the worm gear face at a point midway between the points of attachment of the pegs 58, as clearly shown in Fig. 4.

The legs 107 of each of the trip pegs 105 is of such a length as to extend across and engage the arm 94 of the bell crank motor switch 90. Thus, referring to Fig. 5, when the motor switch is closed, the leg 107 of a trip peg 105, moved by virtue of the rotation of the worm wheel 51, will come to a point where it will engage the arm 94, continued movement causing the bell crank 90 to rotate about its pivot to open the switch whereby to stop the motor 56 and the rotation of the worm wheel 51. Movement of the bell crank 90 beyond the dead center position of the coil spring 95 will cause said spring to exert its force on the bell crank 90 to hold the same down. This operation of the motor switch is synchronized with the movement outwardly of the bar 20 by the peg 58, so that when the peg 58 engaging the lug 59 clears the same, the lug 59 will be engaged by the latch 60, and at this point a trip peg 105 will act to trip the bell crank 90 to open the motor switch, in the manner as hereinabove described.

From the above description it is apparent that the signalling apparatus is rendered operative by the operator of the vehicle simply pushing in the lower plunger 83 which normally is out, causing both the light switch and motor switch to close. The motor will rotate the worm gear which in turn will move the extending bar outwardly to extend the lazy-tongs. Extension of the lazy-tongs will rotate the indicator hand to its horizontal operative position. With the extending bar locked by the latch the motor is shut off when the motor switch is tripped open by one of the trip pegs. To restore the indicator apparatus to its inoperative position, the operator has only to push in the upper plunger 82 which movement will open the light switch and at the same time will also act on the latch to cause the latter to release the extending bar. Upon release of the extending bar, the same is retracted under the action of the spring return which movement also collapses the lazy-tongs and swings the indicator hand back to its upright inoperative position.

Having thus described the invention what is claimed is:

1. A signalling apparatus for vehicles comprising, a lazy-tongs, means mounting the same exteriorly on a part of a vehicle body, a control housing mounted interiorly of said vehicle body in opposed relation to said mounting means, a bar slidably supported by said control housing and mounting means and connected at its outer end to said lazy-tongs to extend the same upon outward movement thereof, an indicator hand pivotally mounted on the free end of said lazy-tongs, illuminating means for said indicator hand mounted on said lazy-tongs adjacent said free end thereof, and power-operated means within said control housing connected to said bar for moving the same outwardly, said indicator hand being provided with an opening, means connecting said indicator hand to a link of said lazy-tongs, and operative upon extension of said lazy-tongs to swing said indicator hand from a normally upright inoperative position to a horizontal operative position when the lazy-tongs is fully extended whereby to bring said opening into registry with said illuminating means so as to be visible from each side of said indicator hand.

2. A signalling apparatus for vehicles comprising, a lazy-tongs, means mounting the same exteriorly on a part of a vehicle body, a control housing mounted interiorly of said vehicle body in opposed relation to said mounting means, a bar slidably supported by said control housing and mounting means and connected at its outer end to said lazy-tongs to extend the same upon outward movement thereof, an indicator hand pivotally mounted on the free end of said lazy-tongs, illuminating means for said indicator hand mounted on said lazy-tongs adjacent said free end thereof, power-operated means within said control housing connected to said bar for moving the same outwardly, means for locking said bar upon a predetermined outward movement thereof, means operative upon said predetermined movement to render said power-operated means functionally inoperative, means for releasing said locking means, and spring return means connected to the outer end of said bar to retract the same and collapse said lazy-tongs when said locking means is released, said indicator hand being provided with an opening, a tension spring and flexible cable means connecting the base of said indicator hand to an intermediate link of said lazy-tongs and operative upon extension of said lazy-tongs to swing said indicator hand from a normally upright inoperative position to a horizontal operative position when the lazy-tongs is fully extended whereby to bring said opening into registry with said illuminating means so as to be visible from each side of said indicator hand, said tension spring and flexible cable means being also operative to bring said indicator hand back to its normal upright inoperative position when said locking means is released and said lazy-tongs is collapsed.

3. A signalling apparatus for vehicles comprising, a lazy-tongs, means mounting the same exteriorly on a part of a vehicle body, a control housing mounted interiorly of said vehicle body in opposed relation to said mounting means, a bar slidably supported by said control housing and mounting means and connected at its outer end to said lazy-tongs to extend the same upon outward movement thereof, an indicator hand pivotally mounted on the free end of said lazy-tongs, illuminating means for said indicator hand mounted on said lazy-tongs adjacent said free end thereof, and spring return means connected to said bar to urge the same inwardly, a worm wheel rotatably mounted in said control housing, a worm meshing with said worm wheel, flexible shaft means connecting said worm to an electric motor, a plurality of laterally extending pegs fixed to one face of said worm wheel, a depending lug fixed to said bar adjacent the inner end thereof and arranged to lie initially in the path of movement of said pegs when said bar is in its innermost position, so that as said worm wheel is rotated one of said pegs will engage said lug to impart an outward movement to said bar, said peg engaging said lug only during a predetermined arcuate movement of said worm wheel.

4. A signalling apparatus for vehicles comprising, a lazy-tongs, means mounting the same exteriorly on a part of a vehicle body, a control housing mounted interiorly of said vehicle body in opposed relation to said mounting means, a bar slidably supported by said control housing and mounting means and connected at its outer end to said lazy-tongs to extend the same upon outward movement thereof, an indicator hand pivotally mounted on the free end of said lazy-tongs, illuminating means for said indicator hand mounted on said lazy-tongs adjacent said free end thereof, and spring return means connected to said bar to urge the same inwardly, a worm wheel rotatably mounted in said control housing, a worm meshing with said worm wheel, flexible shaft means connecting said worm to an electric motor, a plurality of laterally extending pegs fixed to one face of said worm wheel, a depending lug fixed to said bar adjacent the inner end thereof and arranged to lie initially in the path of movement of said pegs when said bar is in its innermost position, so that as said worm wheel is rotated one of said pegs will engage said lug to impart an outward movement to said bar, said peg engaging said lug only during a predetermined arcuate movement of said worm wheel, and latch means operative to engage said lug to hold said bar against inward movement by said spring return means when the peg engaging said lug clears the same.

5. A signalling apparatus for vehicles comprising, a lazy-tongs, means mounting the same exteriorly on a part of a vehicle body, a control housing mounted interiorly of said vehicle body in opposed relation to said mounting means, a bar slidably supported by said control housing and mounting means and connected at its outer end to said lazy-tongs to extend the same upon outward movement thereof, an indicator hand pivotally mounted on the free end of said lazy-tongs, illuminating means for said indicator hand mounted on said lazy-tongs adjacent said free end thereof, and spring return means connected to said bar to urge the same inwardly, a worm wheel rotatably mounted in said control housing, a worm meshing with said worm wheel, flexible shaft means connecting said worm to an electric motor, a plurality of laterally extending pegs fixed to one face of said worm wheel, a depending lug fixed to said bar adjacent the inner end thereof and arranged to lie initially in the path of movement of said pegs when said bar is in its innermost position, so that as said worm wheel is rotated one of said pegs will engage said lug to impart an outward movement to said bar, said peg engaging said lug only during a predetermined arcuate movement of said worm wheel, and latch means operative to engage said lug to hold said bar against inward movement by said spring return means when the peg engaging said lug clears the same, said control housing including a motor switch and a separate light switch for said illuminating means, a switch bar pivotally mounted intermediate its ends, a pair of upper and lower plungers each connected to an arm of said switch bar and slidably supported by said housing, the arrangement being such that when the lower plunger is pushed in the upper plunger is pushed out, means on the upper end of said switch bar operative to close said light switch, and means on the lower end of said switch bar adapted to move the motor switch into closed position when said switch bar is actuated by inward movement of the lower plunger whereby said signalling apparatus is rendered functionally operative.

6. In the signalling apparatus as set forth in claim 5, including a plurality of trip pegs mounted on the other face of said worm wheel each of which is adapted to trip said motor switch to open the same when said latching means engages said bar lug whereby said motor is stopped, said switch bar upon inward movement of the upper plunger being adapted to engage said latch means to release the same whereby said bar is moved inwardly under the action of the spring return means to collapse said lazy-tongs.

PETER A. PETERSON.
HERMAN SIEBERT.

REFERENCES CITED

The following references are of record in the file of this patent:

UNITED STATES PATENTS

| Number | Name | Date |
|---|---|---|
| 1,299,361 | Lieberman | Apr. 1, 1919 |
| 1,369,998 | Wolter | Mar. 1, 1921 |
| 1,452,681 | Fujimoto et al. | Apr. 24, 1923 |
| 1,472,186 | Morris | Oct. 30, 1923 |
| 1,557,064 | Kerr | Oct. 13, 1923 |
| 1,962,652 | Good | June 12, 1934 |
| 2,084,984 | Bedford et al. | June 29, 1937 |
| 2,106,660 | Ross | Jan. 25, 1938 |